United States Patent
Ballal et al.

(10) Patent No.: US 12,194,680 B2
(45) Date of Patent: Jan. 14, 2025

(54) SHORT-LENGTH AND EFFICIENT LIQUID COOLED DISPENSER METHOD

(71) Applicant: FABHEADS AUTOMATION PRIVATE LIMITED, Kottivakkam (IN)

(72) Inventors: Akshay Ballal, Semencherry (IN); Dhinesh Kanagaraj, Thoraipakkam (IN)

(*) Notice: Subject to any disclaimer, the term of this patent is extended or adjusted under 35 U.S.C. 154(b) by 96 days.

(21) Appl. No.: 17/624,272

(22) PCT Filed: Mar. 10, 2021

(86) PCT No.: PCT/IN2021/050229
§ 371 (c)(1),
(2) Date: Dec. 31, 2021

(87) PCT Pub. No.: WO2021/199062
PCT Pub. Date: Oct. 7, 2021

(65) Prior Publication Data
US 2023/0347593 A1    Nov. 2, 2023

(30) Foreign Application Priority Data
Apr. 1, 2020 (IN) .............................. 202041014618

(51) Int. Cl.
*B29C 64/30*    (2017.01)
*B29B 13/02*    (2006.01)
*B29B 13/04*    (2006.01)
*B29C 64/118*   (2017.01)
*B33Y 10/00*    (2015.01)
*B33Y 40/10*    (2020.01)

(52) U.S. Cl.
CPC .............. *B29C 64/30* (2017.08); *B29B 13/02* (2013.01); *B29B 13/04* (2013.01); *B29C 64/118* (2017.08); *B33Y 10/00* (2014.12); *B33Y 40/10* (2020.01)

(58) Field of Classification Search
CPC ........ B29C 64/30; B29C 64/118; B33Y 10/00
USPC .......................................... 264/308
See application file for complete search history.

(56) References Cited

U.S. PATENT DOCUMENTS

2015/0208549 A1* 7/2015 Shedd .................... F25B 23/006
                                                        165/104.27
2018/0345577 A1* 12/2018 Takeyama ............. B29C 64/118

FOREIGN PATENT DOCUMENTS

CN        108501374 A    9/2018

* cited by examiner

Primary Examiner — Jeffrey M Wollschlager
Assistant Examiner — Xue H Liu
(74) Attorney, Agent, or Firm — Jose Cherson Weissbrot

(57) ABSTRACT

A method for manufacturing an object by a dispenser is provided herein. The method includes feeding printing material to a printer. The method further includes receiving a liquid coolant from a coolant source. The method further includes cooling the printing material with the liquid coolant in a helical geometry of a core. The method further includes heating the printing material by a heat source. The method further includes dispensing the printing material for printing by the dispenser.

12 Claims, 6 Drawing Sheets

SHORT-LENGTH AND EFFICIENT LIQUID COOLED DISPENSER METHOD

FIELD OF THE INVENTION

Embodiments of the present invention, generally relate to a dispenser process, and in particular relate to a liquid cooled dispenser process for manufacturing.

BACKGROUND

An extruder is a part of a three dimensional (3D) printer that dispenses the raw material onto the build surface. The extruder melts the material in its hot end and then extrudes the material out of the nozzle to the build surface. Usually, the extruders perform rapid prototyping of three-dimensional objects by selectively extruding a molten thermoplastic from an extrusion head while moving the extrusion head in three dimensions with respect to a base. Movement of the extrusion head with respect to the base is performed under computer control. For effective extrusion, the cold end should be at a considerably lower temperature than the hot end of the extruder.

Conventional approaches to maintain the lower temperature in the hot end of the extruder rely on air cooling the cold end by placing a fan beside the cold end. However, air cooling is not very efficient as the heat capacity of air is less, and is even ineffective when hot end temperatures are very high (>260° C.). Further, the air cooling may only cool the cold end to the ambient temperature that may not be effective, for example when used in heated environments.

Conventionally, processes have been designed to counter above problem and to sustain higher hot end temperatures, but they are also very ineffective, as they simply replace air with water as the coolant. In the conventional processes, water simply flows around the cold end to absorb heat. In the conventional process, the amount of heat transfer is limited, although it is higher than air-cooled extruders. Further, the water cooled conventional approaches does not perform well in higher ambient temperatures that are required for depositing high melt temperature materials, since the cold end may absorb heat from the ambient.

Therefore, there is a need for an improved process or method that can solve above mentioned problems associated with conventional processes or methods for extruders/dispensers.

SUMMARY

According to an aspect of the present disclosure, a method for printing is provided herein. The method includes feeding printing material to a printer. The method further includes heating the printing material by a heat source. The method further includes receiving a liquid coolant from a coolant source. The method further includes effectively cooling the printing material in the cold end with the liquid coolant by promoting a helical flow with the inlet in the bottom zone and outlet in the top. The method further includes dispensing the printing material by the dispenser.

The preceding is a simplified summary to provide an understanding of some aspects of embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

To facilitate understanding, like reference numerals have been used, where possible, to designate like elements common to the figures.

DETAILED DESCRIPTION

As used throughout this application, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Figure 1:
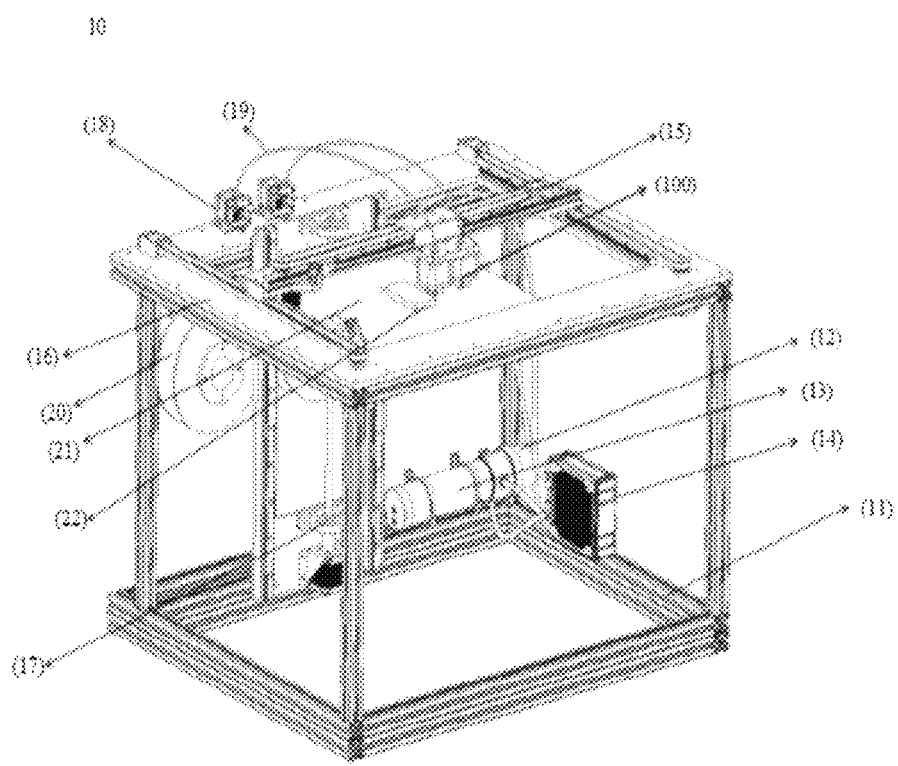
FIG. 1 illustrates a schematic diagram of a printer, according to an embodiment of the present invention.

FIG. 1 illustrates an embodiment of a printer 10 for printing an object through additive manufacturing or 3D printing. As shown in FIG. 1, the printer 10 includes a chassis 11, a pump 12, a coolant reservoir 13, and a radiator/filter 14. The printer 10 further includes X gantry 15, Y gantry 16, and Z gantry 17. The printer 10 further includes material feed motor 18, material feed tube 19, and feed material 20. The printer 10 further includes print platform 21 and printed part 22 as output. According to an embodiment of the present invention, the printer 10 further includes a liquid cooled extruder 100.

Figure 2:
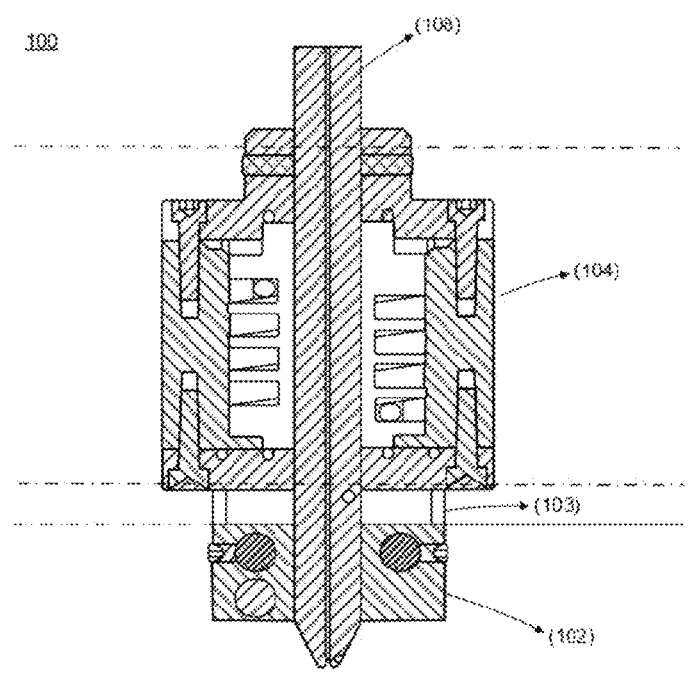
FIG. 2 illustrates a schematic diagram of a dispenser, according to an embodiment of the present invention.

FIG. 2 illustrates schematic diagram of a dispenser 100. As shown in FIG. 2, the dispenser 100 includes a hot end portion 102, a cold end portion 104, a coolant source 304 (not shown in FIG. 2), and a material feed portion 108. The cold end 104 is kept cool by the flow of coolant that enters the cold end through the coolant inlet (129), flows around the channels (128), taking the heat from the helical core and finally exiting the cold end through the coolant outlet port (125).

Figure 3:
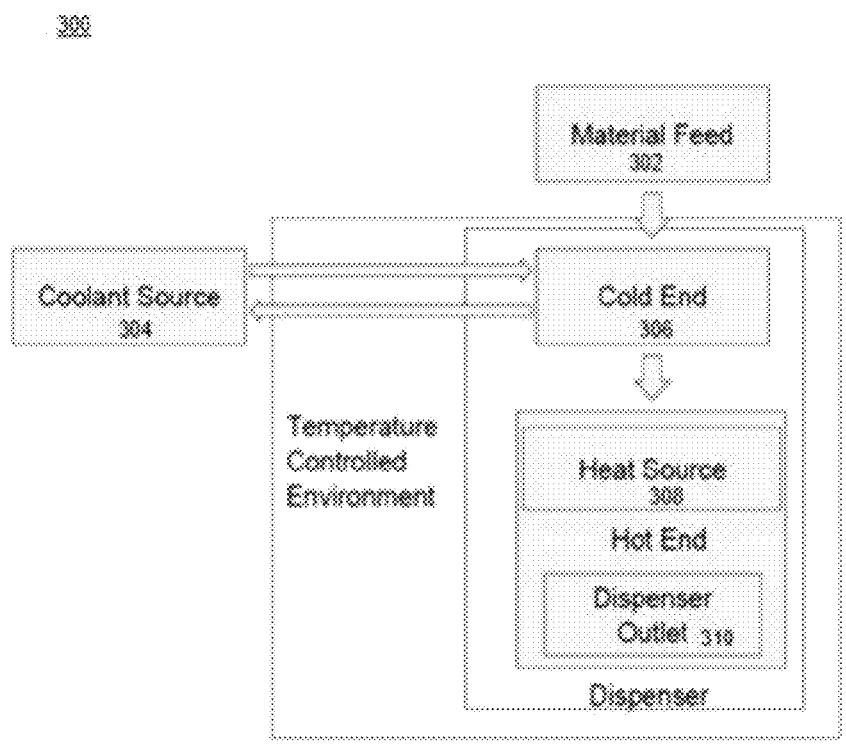
FIG. 3 illustrates a flowchart of a method of cooling a dispenser by a liquid, according to an embodiment of the present invention.

FIG. 3 illustrates a flowchart of a method of printing an object and cooling a dispenser by a liquid, according to an embodiment of the present invention. At step 302, printing material is fed to the printer. In an embodiment, the printing material may be made of suitable material including, but not limited to, plastic. At step 304, a liquid coolant is received from a coolant source. In an embodiment, the coolant source may be located outside the dispenser, from where coolant may be received and returned back.

Figure 5:
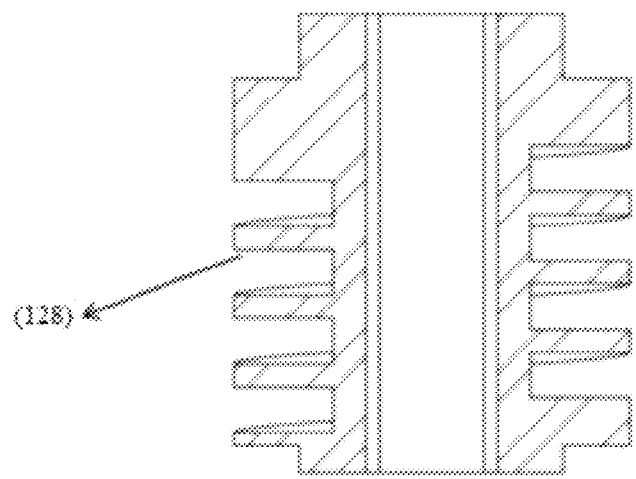
FIG. 5 illustrates the cross section of a helical core of dispenser, according to an embodiment of the present invention.

At step 306, core is cooled with the liquid coolant (i.e., the coolant received from the coolant source). In an embodiment, the cooled core is configured to keep printing material cool. In an embodiment, the printing material may be cooled at the cold end portion 104 of the dispenser 100. In an embodiment, the cooling includes cooling the liquid coolant by using a helical core 122 of the cold end portion of the dispenser. In an embodiment, geometry of the channels (as shown in FIG. 5) due to helical core is configured to increase the area of contact of the core with the coolant, and the coolant's residence time inside casing, thereby increasing the efficiency of cooling.

At step 308, printing material is heated by a heat source. In an embodiment, the printing material may be heated at the hot end portion 102. At step 310, printing material is dispensed by a dispenser. In an embodiment, a nozzle may act as the dispenser.

Figure 4:
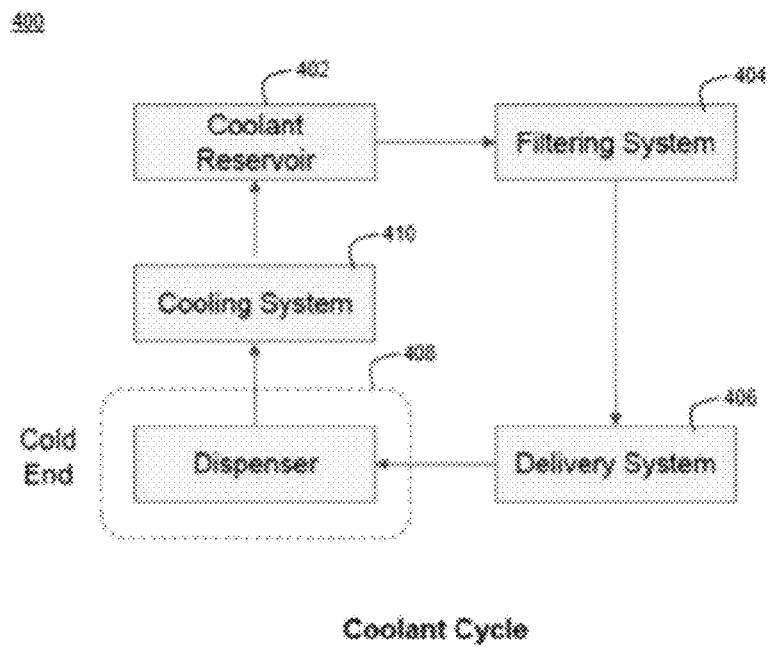
FIG. 4 illustrates a flowchart of a method of recycling liquid coolant for a dispenser, according to an embodiment of the present invention.

FIG. 4 illustrates a flowchart of a method of recycling liquid coolant for a dispenser, according to an embodiment of the present invention. At step 402, coolant is taken from a coolant reservoir or a coolant source. In an embodiment, the coolant reservoir may be located outside the dispenser. Further, the coolant reservoir may contain the coolant at the predetermined optimal condition, for example, appropriate temperature, pH, and purity. Further, the coolant reservoir may be connected to an active or passive cooling system to maintain a lower coolant temperature, which may include radiators, thermoelectric coolers, refrigeration cycle, etc.

At step 404, coolant is filtered by a filtering system. In an embodiment, the filtering system may remove any contaminants that might enter into the coolant cycle. At step 406, coolant is delivered to a delivery system. In an embodiment, the delivery system may include a pump, and the inlet/outlet piping. At step 408, coolant is provided to a dispenser. In an embodiment, the coolant is provided to the cold end portion of the dispenser. At step 410, the coolant is returned back to the cooling system.

The method 300 and 400 advantageously provide advanced cooling process that may be used but not limited to in three-dimensional (3D) printing apparatus. The method 300 is capable of attaining higher extrusion temperatures in a more efficient and effective manner by using liquid coolant (instead of air used by conventional dispensers). Further, the method 300 advantageously ensures effective heat transfer, as the water starts to flow from the bottom of the core which is the hottest region and exits at the top of the core which is relatively less hot while maintaining a helical flow, maximizing the contact area of the coolant. Those skilled in art will appreciate that the method ensures maximum heat transfer as cold water comes in contact with the hottest part of the core.

Figure 6:
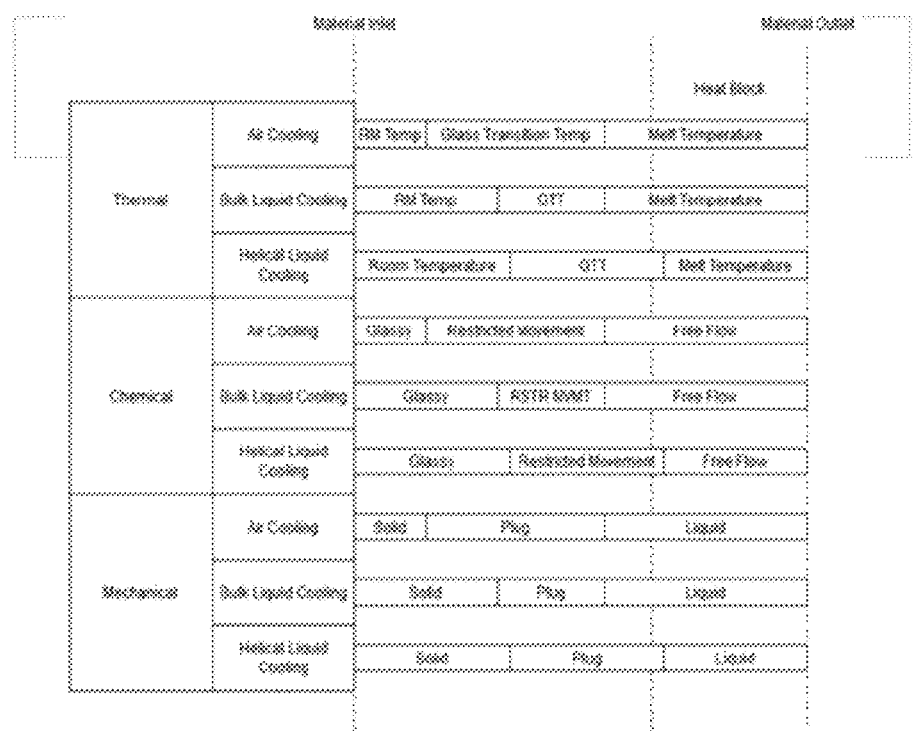
FIG. 6 compares the mechanical, chemical and thermal state of the material along the dispenser for various cooling methods.

As shown in FIG. 6, helical cooling ensures the material stays below the melting temperature at any part above the heat block. In a preferred embodiment, the flow rate of the coolant can be controlled by controlling the power of a pump by taking feedback from a temperature sensor monitoring the temperature of the material in the transition zone 103. The flow rate of the coolant is controlled to keep the temperature of the printing material below melting point anywhere above the heat block. Those skilled in art will appreciate that the melting only starts in the heat block which is ideal for effective extrusion. This also limits restricted movement of the material in the material passage thus eliminating the need for the coating the material passage unlike in other methods of cooling where whole material passage has to be coated. Those skilled in art will appreciate that this makes the system more economical as the coating process can be very expensive. Further, the response of the system is much faster as the pressure build up is caused only in the heat block. Pushing the material through the feed causes the flow through the nozzle and when the pushing force is removed, the material stops flowing unlike in other methods where there is a delay for the flow to stop which can have adverse effects on the products made using the dispenser in some applications.

Further, cooling effect provided by the method 300 allows a relatively shorter core (due to helical shape of core) in the cold end portion, and hence a shortened cold end portion. Further, the method 300 provides for faster deposition rates/higher printing speeds because more heat can be supplied to the hot end. Further, since the cold end is shortened, the chances of choking of the printing nozzle due to creep failure are minimized. Further, because of effective heat transfer, the cooling dispenser is more economical due to the requirement of a lower pressure pump. Further, in an embodiment, an insulated outer wall of the cold end portion can prevent transfer of heat to the printing material from the ambient in case of printing in an elevated ambient temperature. This keeps the core of the dispenser cooler even when printing in high ambient temperatures.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of printing an object by a dispenser, the method comprising:
   feeding printing material to a printer;
   receiving a liquid coolant from a coolant source;
   cooling the printing material with the liquid coolant in a helical geometry of a core to keep the printing material below a melting temperature, wherein the liquid coolant flows from bottom of the core which is the hottest region and exits at top of the core which is relatively less hot region while maintaining a helical flow and maximizing an area of contact of the core with the liquid coolant;
   heating the printing material by a heat source; and
   dispensing the printing material for printing by the dispenser.

2. The method as claimed in claim 1, wherein the helical geometry of the core is configured to increase the area of contact of the core with the coolant, and increase efficiency of cooling.

3. The method as claimed in claim 1, wherein the printing material is cooled at a cold end portion of the dispenser.

4. The method as claimed in claim 1, wherein the printing material is heated at a hot end portion of the dispenser.

5. The method as claimed in claim 1, wherein the coolant is stored at predetermined temperature, pH, and purity.

6. The method as claimed in claim 1, wherein the receiving of the liquid coolant comprises filtering the liquid coolant by a filtering system.

7. The method as claimed in claim 6, wherein filtering the liquid coolant by the filtering system comprising removing contaminants from the liquid coolant.

8. The method as claimed in claim 1, wherein the receiving the liquid coolant further comprising delivering the coolant to the dispenser via a delivery system.

9. The method as claimed in claim 8, wherein the receiving the liquid coolant further comprising returning the liquid coolant to the coolant source.

10. The method as claimed in claim 1, wherein the cooling comprises cooling the liquid coolant by using a helical core at a cold end portion of the dispenser.

11. The method as claimed in claim 1 further comprising controlling a flow rate of the liquid coolant in the core to control a temperature of the printing material below a set temperature.

12. The method as claimed in claim 11 wherein the set temperature is below melting point of the printing material anywhere above a heat block.

* * * * *